Jan. 31, 1967   E. P. STONE   3,300,834
MILLING CUTTER TOOL
Filed April 24, 1964

INVENTOR.
EDWARD P. STONE
BY
ATTORNEYS

United States Patent Office 3,300,834
Patented Jan. 31, 1967

3,300,834
MILLING CUTTER TOOL
Edward P. Stone, 4362 Whittle Ave.,
Oakland, Calif. 94602
Filed Apr. 24, 1964, Ser. No. 362,357
2 Claims. (Cl. 29—105)

This invention relates generally to cutting tools, and more particularly is directed to a multiple blade cutting tool for use with a milling machine.

One object of the present invention is to provide a milling cutter tool having a plurality of circumferentially spaced blades which can be accurately positioned at the same radial distance relative to the rotational axis of the tool.

Another object of the present invention is to provide a multiple blade milling cutter tool utilizing triangular blades each having three cutting edges wherein the blades can be mounted on the tool so that any one of the three edges is operatively positioned.

A further object of the present invention is to provide a multiple blade milling cutter tool which is of simple and economic construction, and with which individual cutting blades can be quickly and readily mounted or removed.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing.

Figure 1:
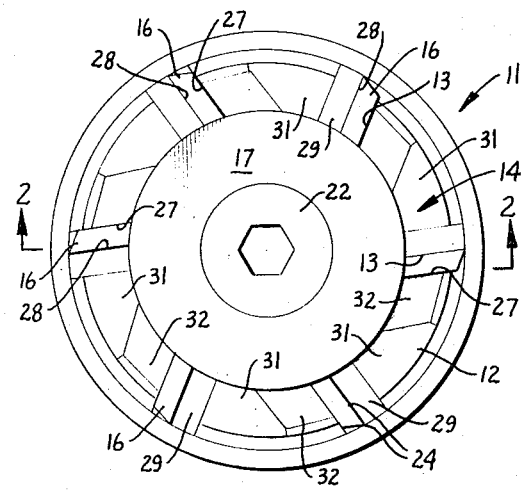
FIGURE 1 is a top plan view of a milling cutter tool embodying the present invention.
Figure 2:
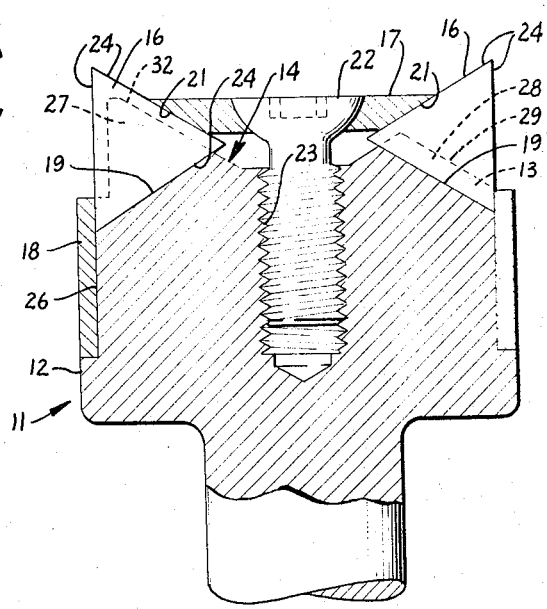
FIGURE 2 is a cross sectional side view taken along the plane of line 2—2 shown in FIGURE 1.

There is shown in FIGURES 1 and 2 a milling cutter tool 11 embodying the present invention, and which generally comprises a substantially cylindrical head 12 having a plurality of grooves 13 disposed in the end face 14 thereof. The grooves 13 extend in a generally radial direction, but as shown are oriented at a slight angle to diameters through the head axis. A plurality of cutting blades 16 are respectively disposed in the grooves 13, and clamping means such as a generally circular clamp member 17 is provided on the head 12 for clamping the blades 16 axially toward the head. Blade stop means such as a cylindrical sleeve 18 is disposed adjacent each of the grooves for accurate radial positioning of the cutting edges of the blades 16.

In more detail now, it is seen that the bottom wall 19 of each groove 13 is disposed at an angle to the axis of the head 12, and tapers radially outwardly toward the other end of the head 12. In the preferred form of the invention as shown, the bottom wall 19 is inclined at an angle of 30 degrees from a transverse plane relative to the axis of the head 12. The clamp member 17 similarly is provided with a beveled surface 21 which is inclined at an angle of 60 degrees in relation to the bottom groove wall 19. A screw 22 engages a threaded bore 23 and serves to secure the clamp member 17 on the head 12.

The blades 16 as shown are of triangular configuration, and each have three cutting edges 24. When the blades 16 are mounted on the instant cutter two of the three edges 24 are engaged respectively by the bottom groove wall 19 and the beveled surface 21. The remaining edge 24 has a portion thereof engaged with the cylindrical sleeve 18, and is operatively positioned for cutting. The latter edge 24 is seen to be disposed parallel with the axis of the head 12. The cylindrical sleeve 18 as shown is precision formed to fit on the outer cylindrical surface 26 of the head 12, and is accurately disposed in concentric relation to the rotational axis of the cutting tool. Accordingly, the operatively positioned cutting edge 24 of all the edges are precisely positioned at exactly the same radial spacing from the rotational axis of the head 12. By forming the clamp member 17 of a softer metal than the blades 16, the clamp member in no way dulls the cutting edges 24 with which it is engaged. Consequently, the blade 16 can be rotated as the edges 24 become worn from use, and all three edges of each blade therefore can be utilized.

In order to support the blade 16 against the rotational forces encountered during cutting operations, it is noted that one of the side walls 27 which define each groove 13 is higher than the other side wall 28. A radially inclined surface 29 is disposed circumferentially adjacent each groove wall 28, and a circumferentially inclined surface 31 extends from adjacent the surface 29 to intersect a raised surface 32 which is circumferentially adjacent the higher groove wall 27. It is seen from the foregoing that while the higher wall 27 provides support for the blade 16, a space is defined on the other side of each blade 16 by the surfaces 29 and 31 which enables accumulation and removal of cuttings.

The cutting tool 11 as just described is particularly suited for radial spacings of the cutting edges of about three-quarter inches to one and one-half inches. An alternate embodiment of the invention is shown in FIGURES 3 and 4, consisting of a cutting tool 33 which is adapted for relatively larger radial spacings of the cutting edges, and which may be used for radial spacings larger than one and one-half inches.

Figure 3:
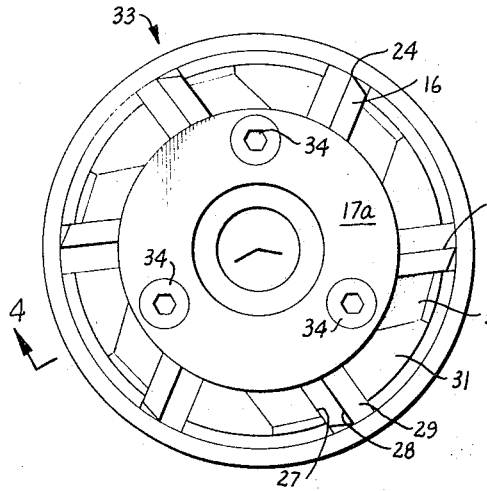
FIGURE 3 is a top plan view of a milling cutter tool comprising an alternate embodiment of the present invention.
Figure 4:
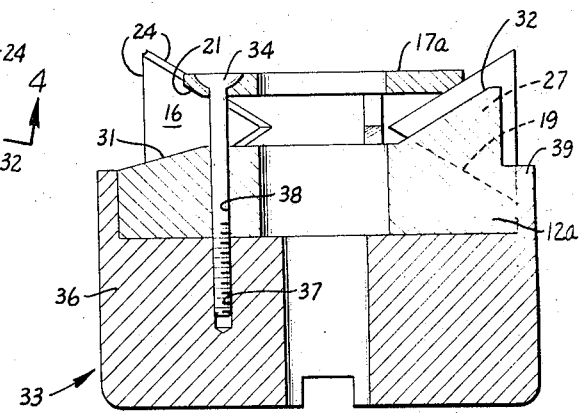
FIGURE 4 is a cross sectional view taken along the line 4—4 as shown in FIGURE 3.

Like numerals in FIGURES 3 and 4 represent the same members as described with regard to the embodiment shown in FIGURES 1 and 2. The main difference with the cutting tool 33 is that a clamp member 17a is provided which has a plurality of circumferentially spaced screws 34 extending axially therethrough, and the head 12 is provided as an insert in another cylindrical member 36, with the screws 34 threadably engaging bores 37 in the member 36. The screws 34 extend through bores 38 in the head 12a. An axially extending sleeve portion 39 formed integrally with the member 36 is seen to provide stop means which functions in the same manner as the cylindrical sleeve 18 used in conjunction with the tool 11 in FIGURES 1 and 2.

The use of the plurality of screws 34 with the tool 33 enables the necessary clamping force to be provided for securing the blades 16, regardless of the diameter of the clamp member 17a.

From the foregoing it is apparent that the cutting tools embodying the present invention as described hereinabove enable a plurality of circumferentially spaced cutting blades to be positioned accurately at the same radial spacing in relation to the rotational axis of the cutter. The blades are quickly removed or inserted by removal of the clamp member, and the triangular blades are able to be used on all three edges.

What is claimed is:
1. A milling tool of the type described, comprising a generally cylindrical head having at least two substantially radially extending grooves in one end face thereof and adapted to receive cutting blades therein, said grooves each having bottom walls which incline radially outwardly and toward the other end face of said head, an annular sleeve stop means secured to said head and positioned across the ends of said grooves at the same radial distance from the axis of said head and adapted to encompass the lower ends of blades positioned in said grooves, a generally circular clamping member secured to said first end face of said head and being axially movable relative to said head, said clamping member being formed of a softer metal than that of the blade, a generally triangular cutting blade disposed in each of said grooves and secured therein by said annular sleeve stop means, said cutting blades having three cutting edges with adjacent edges being disposed at substantially a 60° angle to one another, one of said cutting edges being adjacent said bottom groove wall, another of said cutting edges being engaged by said circular clamping member and the third of said edges being disposed generally parallel to the axis of said head and at a radial distance substantially the same as that of the inner wall of said stop means.

2. The combination of claim 1 wherein in said bottom walls of said grooves are inclined at a 30° angle to a transverse plane to the axis of said cylindrical head, and said circular member has a beveled surface confronting said one end face which surface is beveled at an angle of 60° to both said inclined bottom wall and said head axis, and wherein said stop means includes a cylindrical sleeve disposed around said head and overlying the outer ends of said grooves.

References Cited by the Examiner
UNITED STATES PATENTS

| | | | |
|---|---|---|---|
| 1,460,427 | 7/1923 | Mills | 29—105 |
| 1,521,467 | 12/1924 | Morgan | 29—105 |
| 2,492,797 | 12/1949 | Guetzkow | 29—105.1 |

ANDREW R. JUHASZ, *Primary Examiner.*